United States Patent
Seko (10) Patent No.: US 8,424,407 B2
(45) Date of Patent: Apr. 23, 2013

(54) CORE METAL AND INJECTION GEAR, AND PROCESS FOR MANUFACTURING CORE METAL

(75) Inventor: Yuji Seko, Isesaki (JP)

(73) Assignee: Kabushiki Kaisha PN, Isesaki (JP)

( * ) Notice: Subject to any disclaimer, the term of this patent is extended or adjusted under 35 U.S.C. 154(b) by 976 days.

(21) Appl. No.: 12/453,729

(22) Filed: May 20, 2009

(65) Prior Publication Data

US 2010/0294064 A1    Nov. 25, 2010

(51) Int. Cl.
*F16H 55/12* (2006.01)
*F16H 55/17* (2006.01)

(52) U.S. Cl.
USPC .......................... 74/434; 74/446; 74/DIG. 10

(58) Field of Classification Search ............... 74/412 R, 74/420, 421 A, 421 R, 423, 434, DIG. 10
See application file for complete search history.

(56) References Cited

U.S. PATENT DOCUMENTS 3,541,873 A * 11/1970 Kramer et al. ................ 474/161
3,696,685 A * 10/1972 Lampredi ...................... 474/161

FOREIGN PATENT DOCUMENTS

| JP | A-07-088582 | | 4/1995 |
| JP | 11301501 A | * | 11/1999 |
| JP | A-2001-206230 | | 7/2001 |
| JP | A-2001-286961 | | 10/2001 |
| JP | A-2005-000977 | | 1/2005 |
| JP | 2006194296 A | * | 7/2006 |
| JP | A-2009-061481 | | 3/2009 |
| JP | A-2009-061503 | | 3/2009 |

* cited by examiner

*Primary Examiner* — Phillip A Johnson
(74) *Attorney, Agent, or Firm* — Oliff & Berridge, PLC (57) ABSTRACT

Provided is a core metal including a shaft through-hole allowing a shaft to be inserted thereinto, and a resin locking portion allowing a resin to be locked and fixed, the shaft through-hole having a thicker periphery formed on a periphery of a prepared hole allowing the shaft to be inserted thereinto so as to project on any one of or both a front surface and a back surface of the metal material. The prepared hole and the thicker periphery are molded by subjecting a flat metal material automatically transferred with use of a press machine to drawing, drilling, and thickening.

6 Claims, 10 Drawing Sheets

CORE METAL AND INJECTION GEAR, AND PROCESS FOR MANUFACTURING CORE METAL

BACKGROUND OF THE INVENTION

1. Field of the Invention

The present invention relates to a core metal, an injection gear obtained by using the core metal, and a process for manufacturing a core metal, for example, the core metal for the injection gear.

2. Description of the Related Art

Figure 9A:
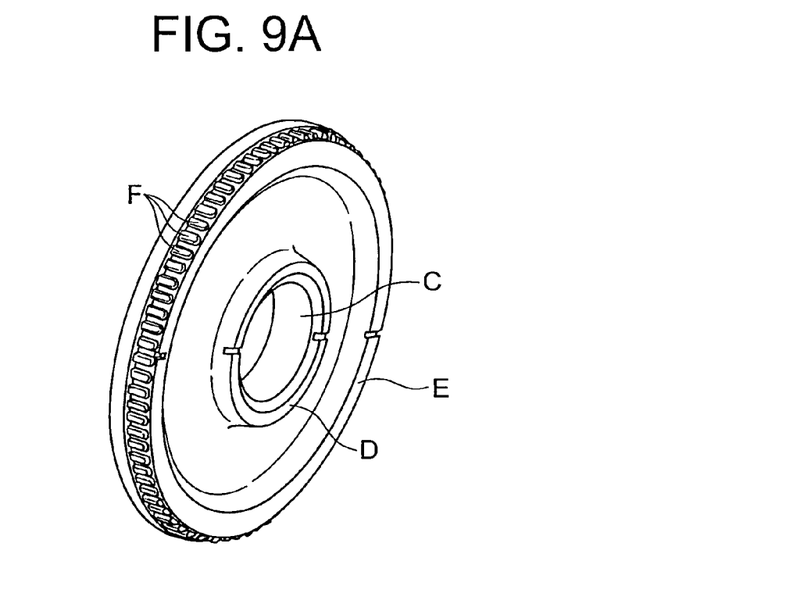
FIG. 9A is a front-side perspective view of an example of a conventional core metal for an injection gear.
Figure 9B:
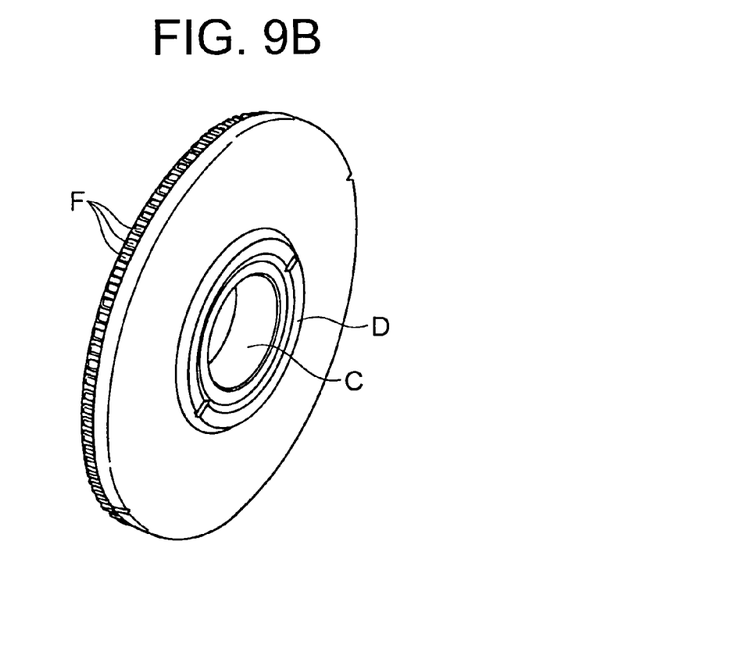
FIG. 9B is a back-side perspective view of the core metal.
Figure 10A:
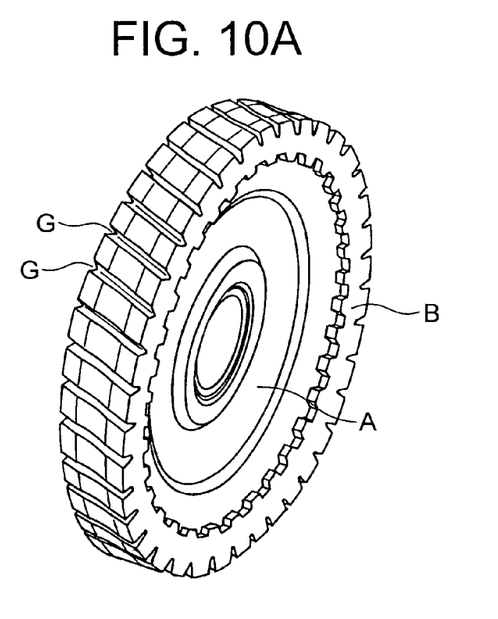
FIG. 10A is a front-side perspective view of an example of a conventional injection gear.
Figure 10B:
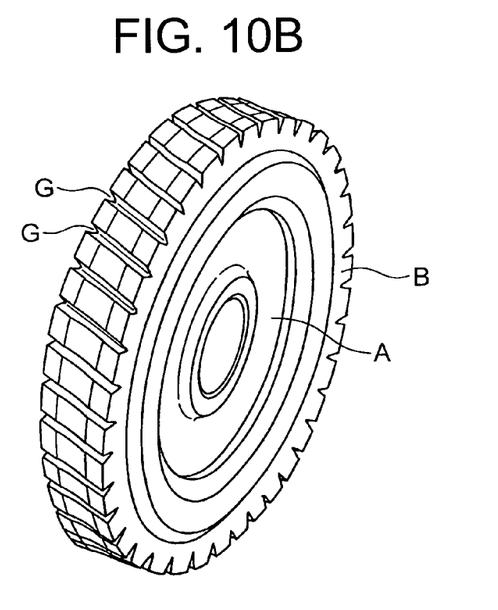
FIG. 10B is a back-side perspective view of the gear.

An injection gear is incorporated in a pinion type electrical power steering mechanism of an automobile. As illustrated in FIGS. 10A and 10B, the injection gear is molded by covering a resin gear B over the outer peripheral portion of a core metal A illustrated in FIGS. 9A and 9B. As illustrated in FIGS. 9A and 9B, Both the front and back surfaces of a peripheral portion D of a shaft hole C and an outer peripheral portion E are large in thickness. A large number of concave-convex protrusions F are formed over the entire of the outer peripheral surface of the outer peripheral portion E. The resin gear B (FIGS. 10A and 10B) molded by a molding method such as injection molding so as to cover the core metal A bites into (is locked to) the outer side of the concave-convex protrusions F, whereby slipping and displacement of the resin gear B is prevented.

A conventional core metal for an injection gear is molded by cold forging. During molding by cold forging, it is necessary to perform intermediate annealing, lubrication, and the like, thereby involving many worker-hours. Therefore, operations are continued intermittently, production time is long, and cost of metal components to be manufactured is high.

SUMMARY OF THE INVENTION (Core Metal of the Present Invention)

A core metal of the present invention includes: a shaft through-hole provided at a central portion so as to allow a shaft to be inserted thereinto; and a resin locking portion provided in an outer peripheral portion so as to lock and fix a resin, in which: the shaft through-hole has a prepared hole allowing the shaft to be inserted thereinto, and a thicker periphery provided on a periphery of the prepared hole and protruding on any one of or both a front surface and a back surface of the metal material; the resin locking portion is obtained by any one of or a combination of at least two of a hole, a dent, concavity/convexity, a notch, a cut-raised piece, a circular-arc groove, a ring groove, and the like, the prepared hole being molded through press working of a part of the disk-shaped metal material with use of a press machine, the thicker periphery being molded by pressurizing the periphery of the prepared hole with use of the press machine so that thickness thereof is increased in comparison with original thickness of the metal material and by being projected at least one of the front surface and the back surface of the metal material.

In the core metal of the present invention, the resin locking portion may be constituted by concavity/convexity molded on the thicker outer peripheral portion of the metal material, the thicker outer peripheral portion being molded by pressurizing the outer peripheral portion of the metal material with use of the press machine so as to increase the thickness thereof in comparison with the original thickness of the metal material, the concavity/convexity molded by subjecting the thicker outer peripheral portion to one of forging and press working with use of the press machine.

The core metal of the present invention may have the resin locking portion obtained by any one of or a combination of at least two of the hole, the dent, the concavity/convexity, the notch, the cut-raised piece, the circular-arc groove, the ring groove, the concavity/convexity molded on the thicker outer peripheral portion of the metal material, and the like. The resin locking portion including the hole, the dent, the concavity/convexity, the notch, the cut-raised piece, the circular-arc groove, the ring groove, and the like may be molded by being subjected to press working with use of the press machine, and the resin locking portion of the concavity/convexity of the thicker outer peripheral portion may be molded by forging or by subjecting the thicker outer peripheral portion to press working with use of the press machine, the thicker outer peripheral portion being increasing in thickness in comparison with original thickness by press working the outer peripheral portion of the metal material.

(Injection Gear of the Present Invention)

An injection gear of the present invention is obtained by covering an outer peripheral portion of a core metal with a resin gear, in which: the core metal comprises the core metal according to any one of the above; and the resin gear is covered over the outer peripheral portion of the core metal and an outside thereof and is locked and fixed to a resin locking portion of the core metal.

(Process for Manufacturing Core Metal of the Present Invention)

The present invention provides a process for manufacturing a core metal, the core metal including: a shaft through-hole provided at a central portion so as to allow a shaft to be inserted thereinto; and a resin locking portion provided in an outer peripheral portion so as to lock and fix a resin, the shaft through-hole having a prepared hole allowing the shaft to be inserted thereinto, and a thicker periphery provided on a periphery of the prepared hole and protruding on any one of or both a front surface and a back surface of the metal material, the resin locking portion being a hole, a dent, concavity/convexity, a notch, a cut-raised piece, a circular-arc groove, a ring groove, and the like. In the process for manufacturing a core metal of the present invention, the prepared hole and the thicker periphery are molded by molding a cylindrical flange by projecting a part of the flat metal material on any one of the front surface and the back surface of the metal material through press working with use of a press machine, by subjecting, after transferring the metal material to a subsequent step with use of the press machine, the projected portion to press working with use of the press machine so as to form the prepared hole, and by extruding periphery of the prepared hole on the projected surface, and projecting the thicker periphery on at least one of the front surface and the back surface of the metal material after transferring the metal material to a subsequent step with use of the press machine so as to mold the thicker periphery by pressurizing the flange with use of the press machine so as to increase thickness thereof in comparison with original thickness of the metal material, and the resin locking portion is molded by subjecting the outer peripheral portion of the metal material to press working with use of the press machine.

In the case where the core metal has the resin locking portion constituted by the concavity/convexity molded on the thicker outer peripheral portion of the metal material, the outer peripheral portion of the metal material is subjected to press working with use of the press machine so as to be protruded on any one of the front surface and the back surface of the metal material, and the thicker outer peripheral portion obtained by pressurizing the projected portion with use of the press machine so as to be increased in thickness thereof in comparison with the original thickness of the metal material is subjected to forging or press working with use of the press machine. In this manner, the concavity/convexity can be molded on the thicker outer peripheral portion.

In the case where the core metal has the resin locking portion obtained by any one of or a combination of at least two of the hole, the dent, the concavity/convexity, the notch, the cut-raised piece, the circular-arc groove, the ring groove, the concavity/convexity molded on the thicker outer peripheral portion of the metal material, and the like, the resin locking portion including the hole, the dent, the concavity/convexity, the notch, the cut-raised piece, the circular-arc groove, the ring groove, and the like may be molded by being subjected to press working with use of the press machine, the concavity/convexity can be molded on the thicker outer peripheral portion through one of forging and press working with use of the press machine, the thicker outer peripheral portion being obtained by pressurizing the projecting portion with use of the press machine so as to increase the thickness thereof in comparison with the original thickness of the metal material, the projecting portion being obtained by subjecting the outer peripheral portion of the metal material to press working with use of the press machine and being projected at least on one of the front surface and the back surface of the metal material.

In any of the above-mentioned processes for manufacturing a core metal, in the case where the flange is increased in thickness by being pressurized with use of the press machine, it is desirable that the flange be pressurized with use of the press machine so as to increase the thickness thereof one of after setting a die on an inside of the flange and after setting the die on the inside of the flange and arranging a regulation base on an outer periphery of the flange.

(Effects of Core Metal of the Present Invention)

(1) The core metal of the present invention is inexpensively manufactured because the metal material is subjected to press working while being automatically transferred with use of the press machine.

(2) In the case where the core metal of the present invention has the resin locking portion constituted by the hole, the dent, the concavity/convexity, the notch, the cut-raised piece, the circular-arc groove, the ring groove, and the like, or obtained by the combination thereof, the resin gear covering the outer side thereof is reliably locked and fixed, and hence the resin gear is less likely to slip or involve backlashes with respect to the outer periphery of the core metal.

(3) In the case where the core metal of the present invention has the resin locking portion constituted by the concavity/convexity molded on the thicker outer peripheral portion, the resin locking portion is rigid and the resin gear covered on the outside thereof is reliably locked and fixed thereto, and hence the resin gear is less likely to slip or involve backlashes with respect to the outer periphery of the core metal.

(Effect of Injection Gear of the Present Invention)

The injection gear of the present invention is obtained by covering the core metal provided with the resin locking portion having a shape which has been difficult to mold in cold forging with the resin gear, and hence the resin gear is stably locked and fixed to the core metal, whereby locking is performed without involving backlashes or a displacement.

(Effect of Process for Manufacturing Core Metal of the Present Invention)

(1) In cold forging, it is necessary to perform intermediate annealing, lubrication, and the like. However, in the present invention, the shaft through-hole having the thicker outer peripheral portion at least on the periphery of the prepared hole is easily manufactured because the metal material is subjected to press working while being automatically transferred with use of the press machine, which leads to excellent productivity. Thus, manufacturing cost of the metal components is reduced, and accordingly, cost of the core metal to be manufactured is reduced.

(2) The shaft through-hole having the thicker outer peripheral portion on the periphery of the prepared hole is subjected to drawing, pressurizing, bending, or the like so as to increase the thickness thereof. Therefore, the thick portion of the core metal can be molded even with a thin metal material, whereby it is possible to save material cost, and possible to achieve weight reduction of the core metal to be manufactured.

(3) The resin locking portion is molded through press working with use of the press machine, and hence it is possible to mold the resin locking portion having complex structures, such as the holes, the notches, and the cut-raised pieces, which cannot be molded by cold forging. Therefore, the process for manufacturing a core metal of the present invention is suitable in manufacturing a core metal, especially, a core metal for an injection gear.

(4) Owing to molding through press working, it is possible to use a flat metal material, and it is unnecessary to prepare thick materials unlike the case of cold forging. Therefore, material cost can be reduced, which contributes to resource saving because materials can be used without waste at the time of working.

(5) In order to conduct mass-production by cold forging, it is necessary to prepare a large number of dies having the same shape or structure and to prepare multi-cavity die. In this context, variation in dimension of the die has influence on the products, which leads to variation in dimension of the manufactured metal components. However, in the manufacturing process of the present invention, at least the shaft through-hole, the resin locking portion and the thicker outer peripheral portion are molded through press working of the press machine. Therefore, variation is unlikely to be generated unlike the case of cold forging, whereby dimensions of the products are stabilized.

(6) At the time of molding the thicker outer peripheral portion on the periphery of the prepared hole, the flange is pressurized with use of the press machine one of after setting the die on an inside of the flange and after setting the die on the inside of the flange and arranging the regulation base on an outer periphery of the flange. Therefore, it is possible to mold the thicker outer peripheral portion having a desired shape and a desired thickness.

DETAILED DESCRIPTION OF THE PREFERRED EMBODIMENTS

First Embodiment of Core Metal

Figure 4A:
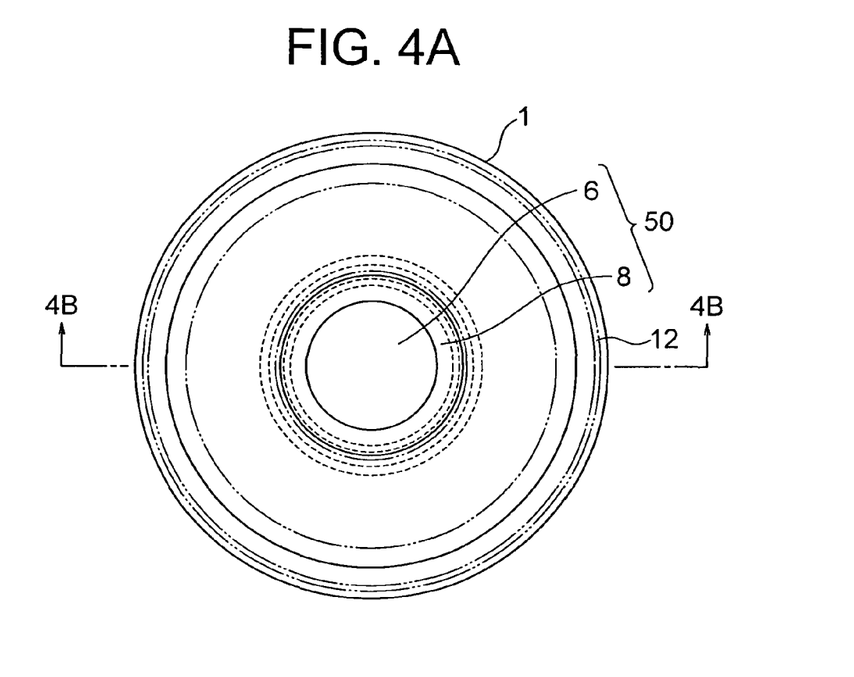
FIG. 4A is a plan view of an example of a core metal manufactured by the process for manufacturing a core metal of the present invention.
Figure 4B:
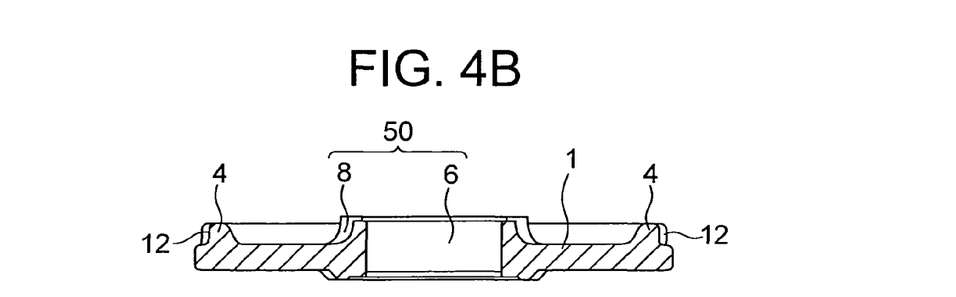
FIG. 4B is a sectional view taken along line 4B-4B of FIG. 4A.

As illustrated in FIGS. 4A and 4B, a core metal of the present invention has a shaft through-hole 50 provided at the central portion of a plate substrate (metal material) 1 so as to allow a shaft to be inserted thereinto and a resin locking portion 12 provided in the outer peripheral portion of the metal material 1.

As illustrated in FIGS. 4A and 4B, the shaft through-hole 50 is constituted by a prepared hole 6 serving as an inner diameter and allowing a shaft such as a rotation shaft or a support shaft to be inserted thereinto and a thicker periphery 8 formed on the periphery thereof. The prepared hole 6 is molded through press working of the central portion of the disk-shaped metal material 1 with use of a press machine. The thicker periphery 8 is formed of the periphery of the prepared hole 6, which is pressurized with use of the press machine so that the thickness thereof is increased in comparison with the original thickness of the metal material 1. The thicker periphery 8 is projected by the pressurization on both the front and back surfaces of the metal material 1 as illustrated in FIG. 4B. The projecting dimension is larger on the front surface side of the metal material 1 and is smaller on the back surface side thereof. The thicker periphery 8 may project only on any one of the front and back surfaces of the metal material 1.

Figure 6A:
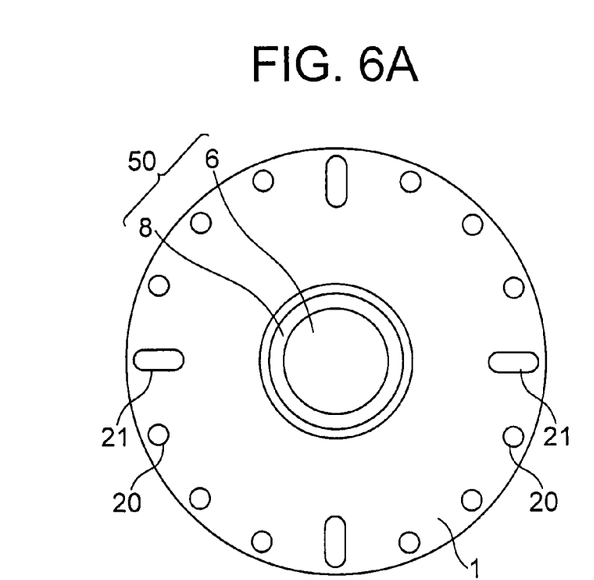
FIGS. 6A to 6D are explanatory views of an example of a working method for a resin locking portion of the core metal molded by the process for manufacturing a core metal of the present invention.
Figure 6B:
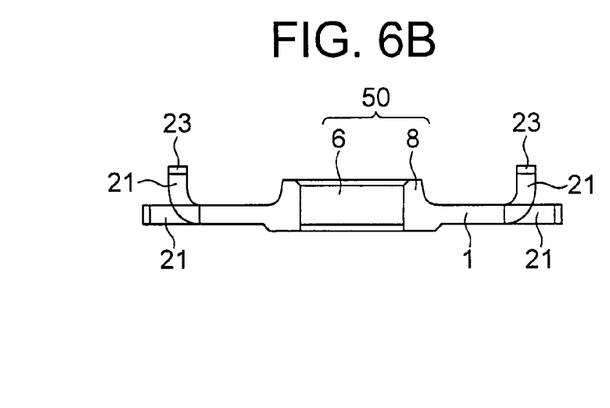

The resin locking portion 12 of FIGS. 4A and 4B has concavity/convexity (gear shape as illustrated in FIG. 9) molded on the outer peripheral surface of a thicker outer peripheral portion 4 which is formed by increasing the thickness of the outer peripheral portion of the metal material 1 in comparison with the original thickness. The resin locking portion 12 may include holes having various shapes and dimensions, such as circular holes 20 and elongated holes 21 as illustrated in FIGS. 6A and 6B, protruding portions 23 as illustrated in FIGS. 6B and 6D and FIGS. 7C and 7D, notches 22 as illustrated in FIG. 7A, and cut-raised pieces 24 as illustrated in FIG. 7B. Alternatively, as long as having a shape or a structure, which allows a resin gear B (FIG. 8) to be locked and fixed, the resin locking portion 12 may include dents, concavity/convexity, circular-arc grooves, and a ring groove (not shown).

FIGS. 6A and 6B illustrate an example of the resin locking portion 12, in which the circular holes 20 and the elongated holes 21 are formed in the outer peripheral portion of the disk-shaped metal material 1 with use of a press machine, the outer peripheral portion being subjected to drawing or bending with use of the press machine so as to be projected on the front surface side of the metal material 1, the circular holes 20 and the elongated holes 21 constituting the resin locking portion 12. With this, a covering resin flows into the circular holes 20 and the elongated holes 21 so as to achieve locking and fixation. All of the holes may include circular holes, elongated holes, or holes having other shapes, such as rectangular holes.

Figure 6C:
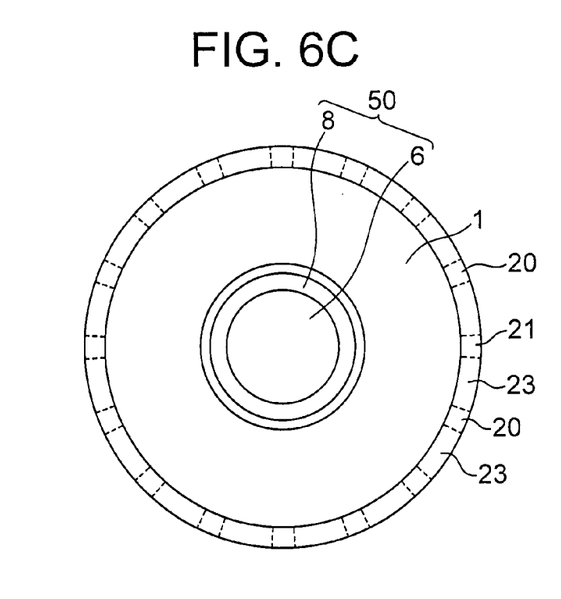
Figure 6D:
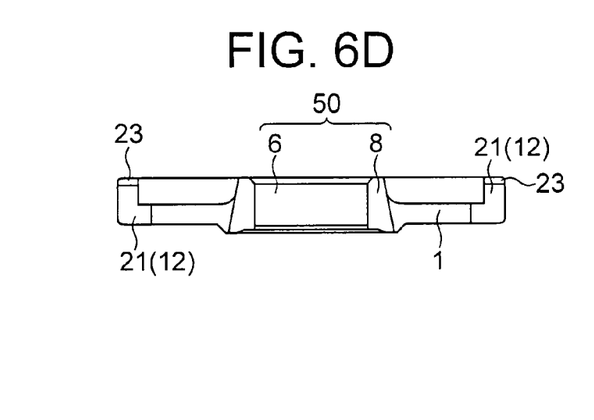
Figure 7A:
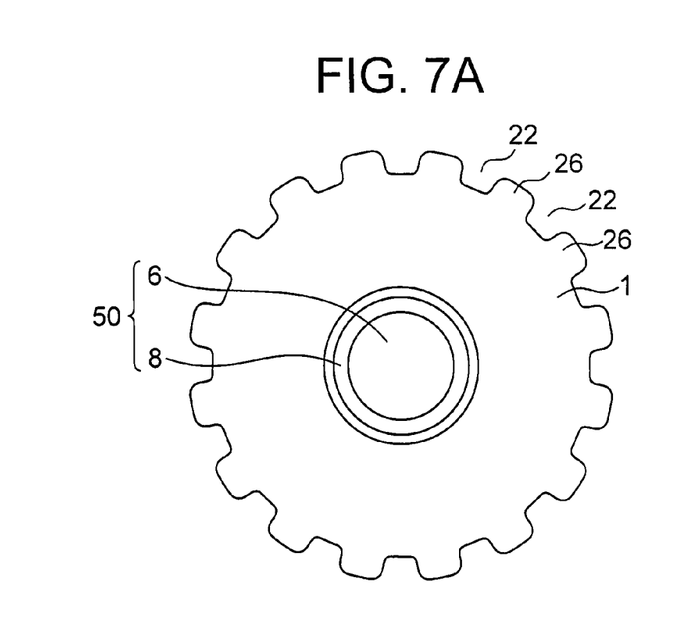
FIGS. 7A to 7D are explanatory views of another example of a working method for a resin locking portion of the core metal molded by the process for manufacturing a core metal of the present invention.
Figure 7B:
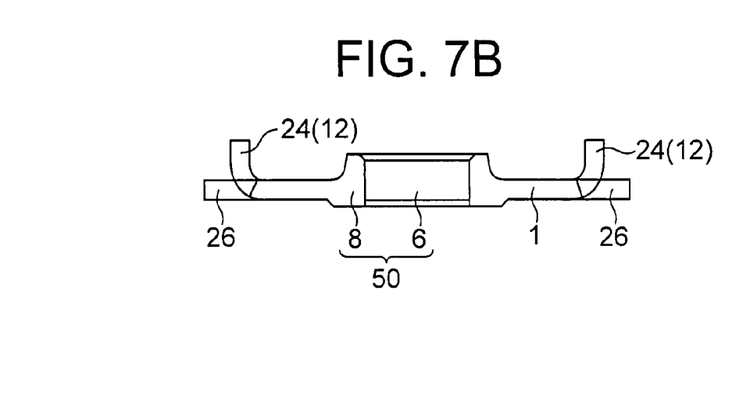

FIGS. 6C and 6D illustrate an example of the resin locking portion 12, in which the elongated holes 21 are formed in the outer peripheral portion of the disk-shaped metal material 1 with use of a press machine, the outer peripheral portion being subjected to drawing or bending with use of the press machine so as to be projected on the front surface side of the metal material 1, the projected outer peripheral portion being pressurized and crushed with use of the press machine so as to mold the thicker outer peripheral portion 4, the elongated holes 21 constituting the resin locking portion 12. With this, a covering resin flows into the elongated holes so as to achieve locking and fixation. The holes may include circular holes, rectangular holes, or holes having other shapes.

FIGS. 7A and 7B illustrate the notches 22 and the cut-raised pieces 24 as an example of the resin locking portion 12. The cut-raised pieces 24 can be molded by molding the notches 22 and protruding pieces 26 at equal intervals on the outer periphery of the disk-shaped metal material 1, and by projecting the protruding pieces 26 on the front surface side of the metal material 1 by drawing or bending with use of a press machine. While being projected in the same direction (on front surface side of metal material), all the cut-raised pieces 24 of FIG. 7B may be projected on both the front and back surface sides of the metal material 1. In any of the cases, it is unnecessary to form all the cut-raised pieces 24 to have the same shape, the same size, and the same protruding length, and also possible to form all the cut-raised pieces 24 to have different shapes, sizes, and protruding lengths.

Figure 7C:
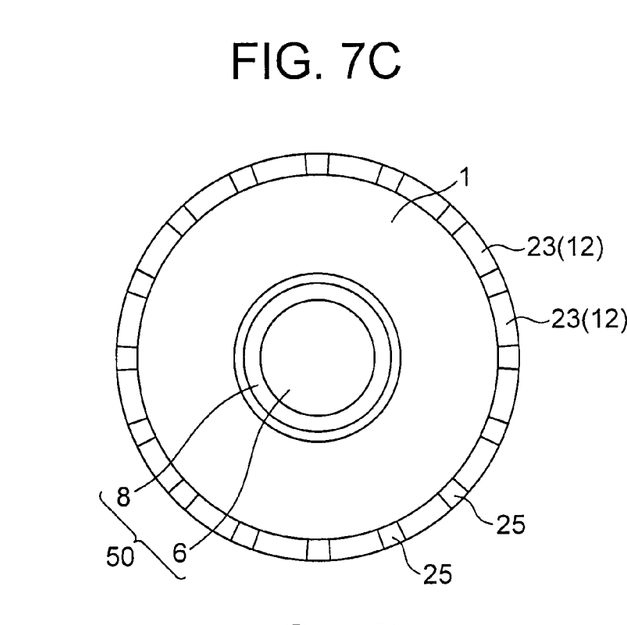
Figure 7D:
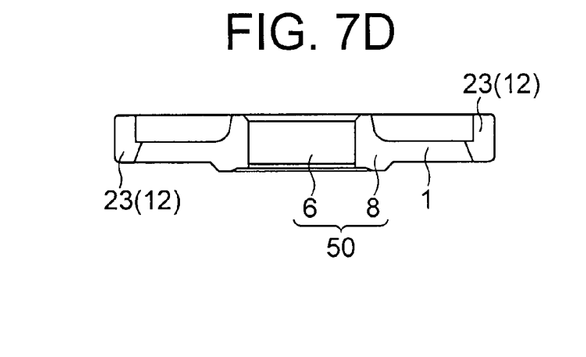

FIGS. 7C and 7D illustrate protruding portions 23 and recessed portions 25 as an example of the resin locking portion 12. The protruding portions 23 and the recessed portions 25 can be molded by projecting the outer peripheral portion of the disk-shaped metal material 1 on the front surface side of the metal material 1 by drawing or bending with use of a press machine, and by pressurizing and crushing the projected portion with use of the press machine to increase the thickness thereof.

The resin locking portion 12 may be obtained by a combination of two or more of the circular holes 20, the elongated holes 21, the dents, the notches 22, the protruding portions 23, the cut-raised pieces 24, the recessed portions 25, and the grooves of various shapes. Alternatively, anyone of or two or more of the resin locking portions 12 thus obtained may be combined with the concavity/convexity molded on the thicker outer peripheral portion 4 of the metal material 1.

The core metal of the present invention may be formed into other shapes than a disk shape, and may be selected in size, structure, and the like in accordance with the application thereof.

Embodiment of Injection Gear

Figure 8:
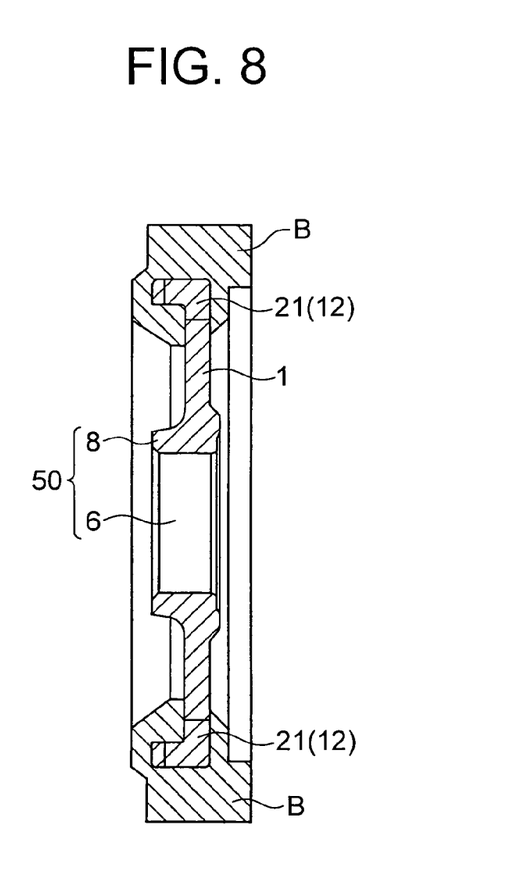
FIG. 8 is a sectional view of an example of a core metal for an injection gear, which is obtained by covering a core metal of the present invention with a resin gear.

FIG. 8 illustrates the resin gear B as an example of an injection gear of the present invention. The resin gear B covers the core metal from the resin locking portion 12 molded on the outer peripheral portion of the core metal illustrated in FIGS. 6C and 6D to the outside of the core metal. The resin gear B is locked and fixed to the resin locking portion 12. As illustrated in FIGS. 10A and 10B, gear grooves (concavity/convexity) G are molded at equal intervals on the outer peripheral surface of the resin gear B.

First Embodiment of Process for Manufacturing Core Metal

Figure 1:
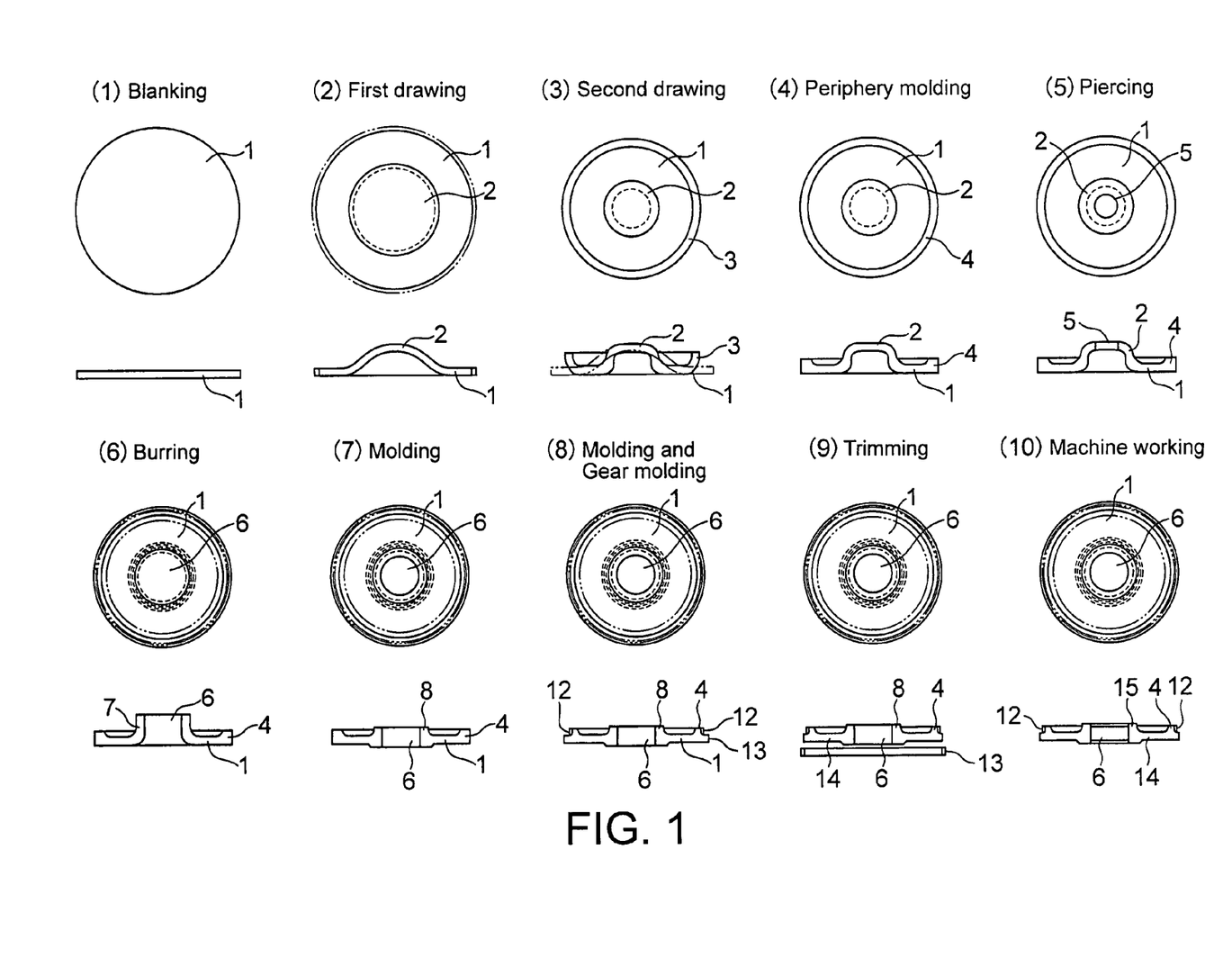
FIG. 1 is an explanatory view of a process for manufacturing a core metal of the present invention, which illustrates working in a case of using a disk-shaped blank material as a metal material.

FIG. 1 illustrates an example of a case of manufacturing a core metal for an injection gear as an example of a process for manufacturing a core metal of the present invention, in which, while being automatically transferred with use of a press machine of a transfer processing type, a disk-shaped blank material (metal material) is subjected to press working in each step so as to manufacture the core metal. The working steps are described in the following.

(1) Working of disk central portion in press machine

The flat metal material 1 formed into a disk shape by being subjected to blanking (Step (1) of FIG. 1) is supplied to the press machine. In a first drawing step (Step (2) of FIG. 1) of the press machine, a central portion 2 of the metal material 1 is drawn onto the front surface side of the metal material 1 (upper side in the figure). In this case, if possible, the central portion 2 of the metal material 1 may be molded through another press working such as extrusion processing. The metal material 1 is transferred to the subsequent step with use of the press machine.

(2) Projection working of outer peripheral portion of disk in press machine (Step (3) of FIG. 1)

Figure 3A:
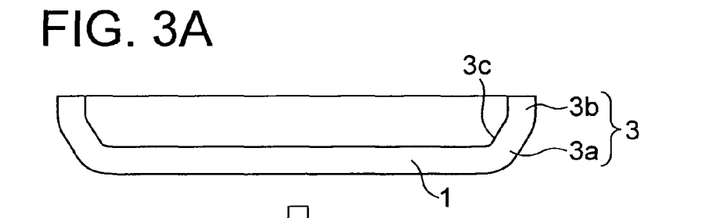
FIGS. 3A to 3D are explanatory views of two examples of a method of crushing an outer peripheral portion by pressurization, which is performed in the process for manufacturing a core metal of the present invention.
Figure 3B:
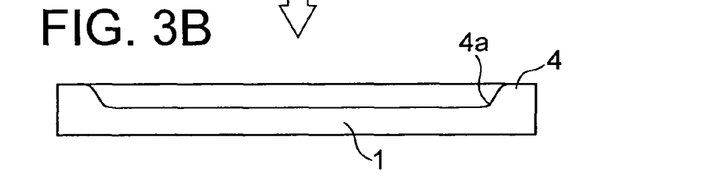
Figure 3C:
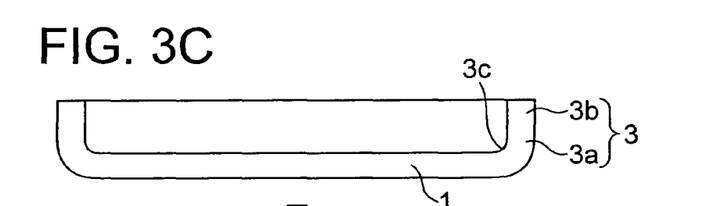

In a second drawing step (Step (3) of FIG. 1) of the press machine, an outer peripheral portion 3 of the metal material 1 is drawn so as to be projected on the front surface side of the metal material 1 (upper side in the figure). In this case, as illustrated in FIG. 3A, a lower portion 3a of the projected outer peripheral portion 3 is obliquely raised. In this context, it is possible to draw the outer peripheral portion 3 such that an upper portion 3b is vertically raised, and also possible to draw the outer peripheral portion 3 such that the lower portion 3a and the upper portion 3b are vertically and collectively raised as illustrated in FIG. 3C. The raising of the outer peripheral portion 3 may be performed through another press working such as bending.

(3) Working of thicker peripheral portion of disk in press machine (Step (4) of FIG. 1)

Figure 3D:
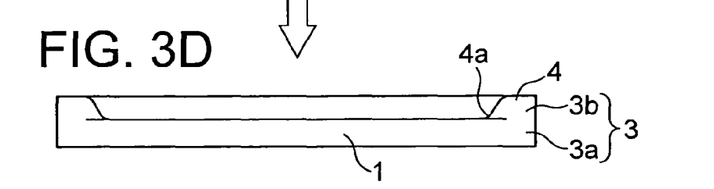

In Step (4) of FIG. 1, the outer peripheral portion 3 of FIG. 3A is pressurized and crushed so as to mold the thicker outer peripheral portion 4 having thickness larger than the original thickness of the metal material 1 and spreading toward the bottom. In this case, as illustrated in FIG. 3B, an inner lower-end portion 4a of the thicker outer peripheral portion 4, which spreads toward the bottom, is aligned to the same position as that of an inner lower-end portion 3c (FIG. 3A) of the outer peripheral portion 3. The upper portion 3b of the outer peripheral portion 3 projected as illustrated in FIG. 3C may be bent inward so as to mold the thicker outer peripheral portion 4 spreading toward the bottom. In this case, the inner lower-end portion 4a (FIG. 3D) of the thicker outer peripheral portion 4, which spreads toward the bottom, is positioned inward with respect to the inner lower-end portion 3a (FIG. 3C) of the outer peripheral portion 3, which has not been bent.

(4) Pierce working in press machine (Step (5) of FIG. 1)

In Step (5) of FIG. 1, a small hole 5 is formed in the central portion 2 of the metal material 1 previously subjected to drawing.

(5) Burring in press machine (Step (6) of FIG. 1)

In Step (6) of FIG. 1, the small hole 5 of the metal material 1 is enlarged so as to form the prepared hole 6, and the peripheral portion of the prepared hole is extruded into a cylindrical shape to the front surface side of the metal material 1 so as to mold a flange 7.

(6) Molding of shaft through-hole in press machine (Step (7) of FIG. 1)

Figure 2:
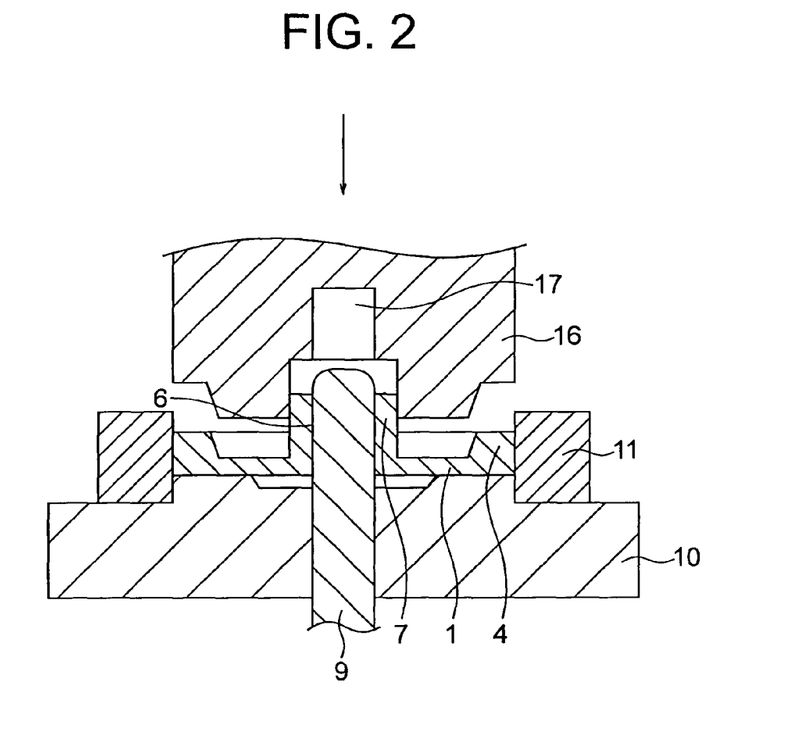
FIG. 2 is an explanatory view of an example of a pressurizing method for a cylindrical portion in the process for manufacturing a core metal of the present invention.

In Step (7) of FIG. 1, the flange 7 is pressurized and crushed so as to increase the thickness of the periphery of the prepared hole 6 in comparison with the original thickness of the metal material 1, and the prepared hole 6 is formed as a shaft hole, whereby the shaft through-hole 50 having the thicker periphery 8 is molded. The thickening can be performed, for example, as illustrated in FIG. 2. As illustrated in FIG. 2, the prepared hole 6 of the metal material 1 subjected to burring is covered over a round-bar die 9 and is set on a pedestal 10, and a ring-shaped regulation base 11 is arranged on the outer periphery of the metal material 1. Then, the flange 7 of the metal material 1 is pressurized and crushed with use of a punch 16. The flange 7 is not bent inward owing to the presence of the die 9 even when being pressurized, and is prevented from being widen outward owing to the presence of the regulation base 11 on the side (outside), whereby the flange 7 is increased in thickness. An escape hole for allowing the distal end side of the die 9 to intrude therein at the time of descending the punch 16 is denoted by reference numeral 17 in FIG. 2.

(7) Molding of resin locking portion (Step (8) of FIG. 1)

In Step (8) of FIG. 1, a concave-convex gear is molded on the entire of the outer periphery of the thicker outer peripheral portion 4, and the gear constitutes the resin locking portion 12. The resin locking portion 12 has a shape illustrated in FIGS. 4A and 4B.

(8) Trimming in press machine (Step (9) of FIG. 1)

In Step (9) of FIG. 1, an outer portion 13 of the thicker outer peripheral portion 4 of the metal material 1 (illustrated in Step (8) of FIG. 1) is cut and removed (trimmed) into a ring shape so that a predetermined dimension of the outer diameter of an inner core metal 14 is obtained.

(9) The disk-shaped core metal 14 press-molded with use of the press machine as (1) to (8) described above is taken out of the press machine, and an upper edge portion 15 of the inner peripheral surface of the prepared hole is subjected to cutting (chamfering) with use of another machine in another step as Step (10) of FIG. 1 so as to form a round surface. The chamfering may be performed also in the press machine, and may be performed also after resin-molding described later.

The resin locking portion 12 may be molded not only through press working with use of the press machine, but also through forging. That is, through forging after the metal material 1 on which the thicker periphery 8 is molded is detached from the press machine, the gear-shaped concavity/convexity (resin locking portion) 12 may be molded on the outer peripheral surface of the thicker outer peripheral portion 4.

(1) to (9) described above illustrate an example of a series of working, and if possible, the series of working may be performed in the steps different from those illustrated in FIG. 1.

Second Embodiment of Process for Manufacturing Core Metal

Figure 5:
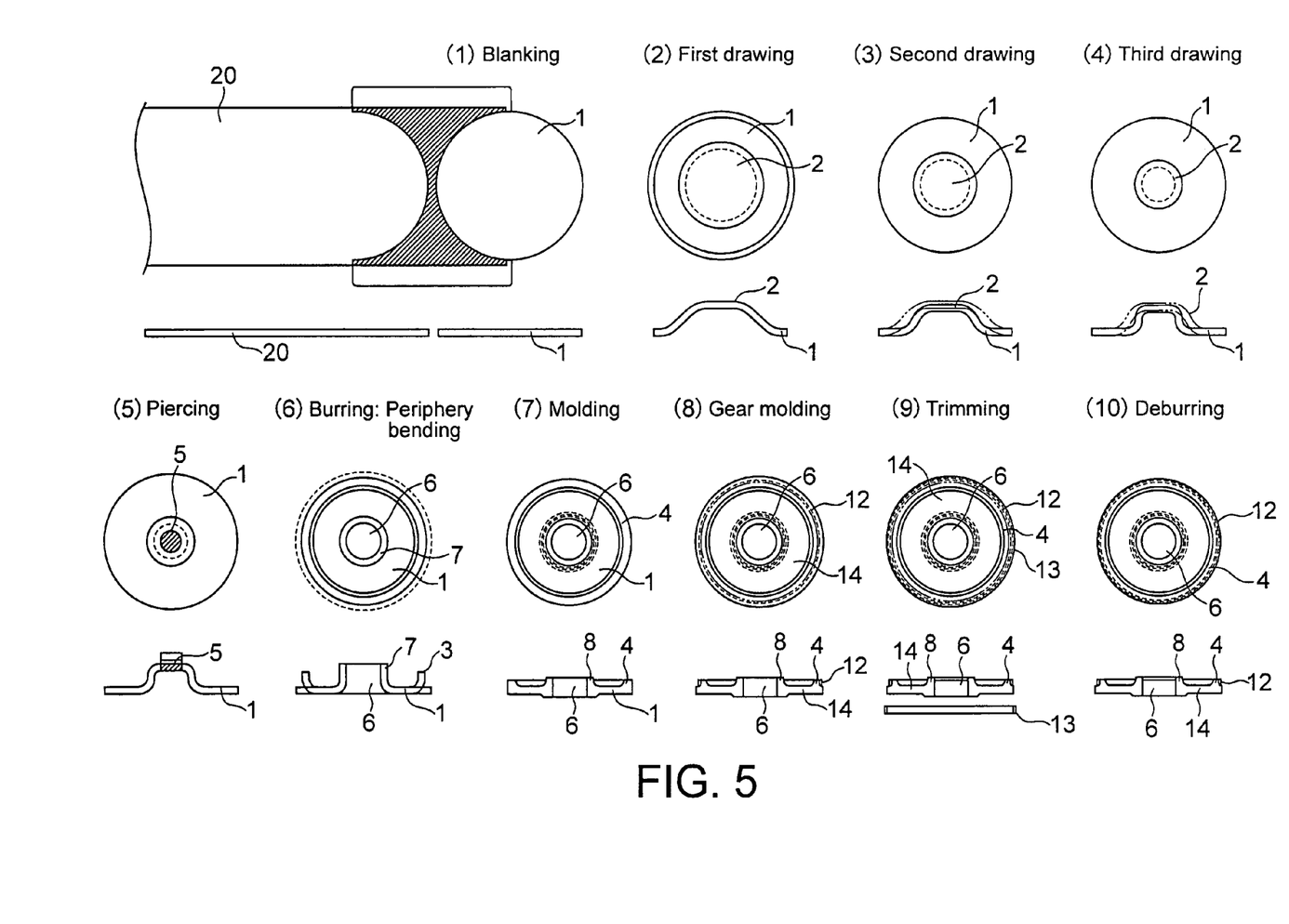
FIG. 5 is an explanatory view of a process for manufacturing a core metal of the present invention, which illustrates working in a case of using a coil material as a metal material.

FIG. 5 illustrates another embodiment of the process for manufacturing a core metal of the present invention. This embodiment also illustrates the case of manufacturing a core metal for an injection gear with use of a press machine, which is different from the manufacturing method for a core metal according to the first embodiment in that a flat plate made of a coiled material and rolled in a roll shape is used as the metal material instead of the blank material. Detailed description thereof is made in the following.

(1) The coiled material rolled in a roll shape (Step (1) of FIG. 5) is successively supplied to the press machine by a coiled material supply mechanism (not shown) provided earlier with respect to the press machine.

(2) The coiled material to be supplied is subjected to blanking by a blanking mechanism (not shown) of the press machine so as to obtain the disk-shaped blank material (metal material) 1 (Step (1) of FIG. 5). The blank material 1 is sequentially transferred to the subsequent working step by a transfer mechanism of the press machine.

(3) In a first drawing step (Step (2) of FIG. 5) of the press machine, the central portion 2 of the metal material 1 is drawn onto the front surface side of the metal material 1. This working may be replaced by another press working.

(4) The drawn (projected) point is subjected to secondary drawing in a second drawing step (Step (3) of FIG. 5) of the press machine so as to increase the drawing height.

(5) The point subjected to drawing in the second drawing step is subjected to tertiary drawing in a third drawing step of the press machine (Step (4) of FIG. 5) so as to reduce the outer shape of the drawn portion.

(6) In a piercing step (punching step: (Step (5) of FIG. 5)) of the press machine, the small hole 5 is formed in the top portion drawn in advance of the small hole 5.

(7) In a burring step (Step (6) of FIG. 5) of the press machine, the prepared hole 6 is formed by enlarging the small hole 5 of the metal material 1 by burring, and the cylindrically projected flange 7 is molded on the periphery of the prepared hole 6. Simultaneously, or after the burring, the metal material 1 is transferred to the subsequent step, and then the outer peripheral portion 3 of the metal material 1 is subjected to drawing or bending so that the outer peripheral portion 3 of the metal material 1 is projected in the same direction as that of the flange 7.

(8) In a molding step (Step (7) of FIG. 5) of the press machine, the flange 7 is pressurized and crushed so that the thickness thereof is increased in comparison with the original thickness of the metal material 1, and the periphery of the prepared hole 6 is molded so as to have the thickness of spreading toward the bottom. Also in this case, with use of a molding die as illustrated in FIG. 2 and similarly to the pressurization described above, the prepared hole 6 of the metal material 1 is covered over the round-bar die 9 and is set on the pedestal 10, and the ring-shaped regulation base 11 is arranged on the outer periphery of the metal material 1. With this, the flange 7 of the metal material 1 can be pressurized and crushed with use of a punch 16. Simultaneously with the pressurizing of the flange 7, the outer peripheral portion 3 is collectively pressurized and crushed with use of the press machine so as to mold the thicker outer peripheral portion 4 spreading toward the bottom. The thicker outer peripheral portion 4 may be increased in thickness by subjecting the outer peripheral portion 3 to inward bending.

(9) In a gear molding step (Step (8) of FIG. 5) of the press machine, gear-shaped concavity/convexity 12 is molded on the entire of the outer periphery of the thicker outer peripheral portion 4.

(10) In a trimming step (Step (9) of FIG. 5) of the press machine, the outer portion 13 of the thicker outer peripheral portion 4 is cut (trimmed) into a ring shape so that a predetermined dimension of the disk-shaped core metal 14 left on the inside is obtained. Then, the thicker outer peripheral portion is deburred (Step (10) of FIG. 5).

(11) The gear-shaped concavity/convexity 12 may be molded on the thicker outer peripheral portion 4 also by forging after the metal material 1 on which the thicker outer peripheral portion 4 is molded is detached from the press machine.

(1) to (11) described above also illustrate an example of a series of working, and if possible, the series of working may be performed in the steps different from those illustrated in FIG. 5.

INDUSTRIAL APPLICABILITY

The process for manufacturing a core metal of the present invention can be used in manufacturing core metals or metal components of various shapes, structures, and sizes, which are used in other fields.

What is claimed is:

1. A core metal, comprising:
   a shaft through-hole provided in a central portion of a flat circular metal plate so as to allow a shaft to be inserted in the shaft through-hole; and
   a resin locking portion provided in an outer peripheral portion of the flat circular metal plate,
   wherein:
      the shaft through-hole has a prepared hole and a thicker periphery provided on an outer portion of the prepared hole;
      the thicker periphery is projected from at least one of a front surface and a back surface of the flat circular metal plate;
      the thicker periphery is increased in a thickness compared to an original thickness of the flat circular metal plate; and
      the resin locking portion includes at least one of a hole, a dent, a concavity/convexity, a gear, a notch, a cut-raised piece, a circular-arc groove, a ring groove, and other shapes, the resin locking portion is molded on the outer peripheral portion of the flat circular metal plate, and the resin locking portion is capable of locking and fixing a resin gear covering an outside of the resin locking portion and at least a portion of a side surface of the flat circular metal plate.

2. An injection gear obtained by covering an outer peripheral portion of the core metal with a resin gear, the injection gear comprising:
   the core metal according to claim 1, wherein the resin gear covers the outer peripheral portion of the core metal and an outside of the core metal and is locked and fixed to the resin locking portion of the core metal.

3. A core metal, comprising:
   a shaft through-hole provided in a central portion of a flat circular metal plate so as to allow a shaft to be inserted in the shaft through-hole; and
   a resin locking portion provided in an outer peripheral portion of the flat circular metal plate,
   wherein:
      the shaft through-hole has a prepared hole and a thicker periphery provided on an outer portion of the prepared hole;
      the thicker periphery is projected from at least one of a front surface and a back surface of the flat circular metal plate;
      the thicker periphery is increased in a thickness compared to an original thickness of the flat circular metal plate;
      the resin locking portion includes a concavity/convexity molded at a set interval in a circumferential direction on an outer surface of a thicker outer peripheral portion of the flat circular metal plate, wherein the thicker outer peripheral portion of the flat circular metal plate is molded on the outer peripheral portion of the flat circular metal plate; and the resin locking portion is capable of locking and fixing a resin gear covering an outside of the resin locking portion and at least a portion of a side surface of the flat circular metal plate.

4. An injection gear obtained by covering an outer peripheral portion of the core metal with a resin gear, the injection gear comprising:

the core metal according to claim 3, wherein the resin gear covers the outer peripheral portion of the core metal and an outside of the core metal and is locked and fixed to the resin locking portion of the core metal.

5. A core metal, comprising:

a shaft through-hole provided in a central portion of a flat circular metal plate so as to allow a shaft to be inserted in the shaft through-hole; and a resin locking portion provided in an outer peripheral portion of the flat circular metal plate, wherein:

the shaft through-hole has a prepared hole and a thicker periphery provided on an outer portion of the prepared hole;

the thicker periphery is projected from at least one of a front surface and a back surface of the flat circular metal plate;

the thicker periphery is increased in a thickness compared to an original thickness of the flat circular metal plate;

the resin locking portion includes at least one of a hole, a dent, a concavity/convexity, a gear, a notch, a cut-raised piece, a circular-arc groove, a ring groove, and other shapes, the resin locking portion is molded on the outer peripheral portion of the flat circular metal plate, and the resin locking portion is capable of locking and fixing a resin gear covering an outside of the resin locking portion and at least a portion of a side surface of the flat circular metal plate; and the outer peripheral portion of the flat circular metal plate is projected from the at least one of the front surface and the back surface of the flat circular metal plate, and a thicker outer peripheral portion of the flat circular metal plate is on the outer peripheral portion of the flat circular metal plate.

6. An injection gear obtained by covering an outer peripheral portion of the core metal with a resin gear, the injection gear comprising:

the core metal according to claim 5, wherein the resin gear covers the outer peripheral portion of the core metal and an outside of the core metal and is locked and fixed to the resin locking portion of the core metal.

* * * * *